INVENTORS.
Cabell N. Pryor, Jr.
Charles R. Greene, Jr.

BY

ATTORNEY

INVENTORS.
Cabell N. Pryor, Jr.
Charles R. Greene, Jr.

BY

ATTORNEY.

INVENTORS.
Cabell N. Pryor, Jr.
Charles R. Greene, Jr.

BY

ATTORNEY.

United States Patent Office 3,373,359
Patented Mar. 12, 1968

3,373,359
ONE-SAMPLE REAL TIME CROSS-CORRELATOR
Cabell N. Pryor, Jr., Silver Spring, Md., and Charles R. Greene, Jr., Santa Barbara, Calif., assignors to the United States of America as represented by the Secretary of the Navy
Filed Oct. 20, 1964, Ser. No. 405,310
2 Claims. (Cl. 324—77)

ABSTRACT OF THE DISCLOSURE

A hybrid correlator which is a compromise between a polarity-concidence correlator and a multiplier correlator. The hybrid correlator multiplies one channel of amplitude information with another channel of time compressed polarity quantized information. The product of this multiplication appears at the output as a number of real time correlation delay points that are based on an integration time equal to the sample period.

The invention described herein may be manufactured and used by or for the Government of the United States of America for governmental purposes without the payment of any royalties thereon or therefor.

The present invention relates generally to correlators and correlation techniques and more particularly to a hybrid type of correlator which multiplies the amplitude information in a first signal channel by the time compressed polarity sampled information in a second signal channel to obtain a sequence of correlation delay points computed in real time and which are based on an integration time equal to the sample period.

The correlation of large amplitude transient signals by multiplier correlation and by polarity coincidence correlation have not proved entirely satisfactory for the analysis of transient input signals. Theoretically, polarity coincidence correlation will generate the correlation function with the largest output signal-to-noise ratio for large amplitude continuous input signals. However, due to normalization of the output of the polarity coincidence correlator, it is not suitable for the analysis of transient input signals. On the other hand, multiplier correlation is a suitable method of analyzing transient signals but the complexity and expense of this device may make its use undesirable. Thus, for the correlation of large amplitude transient signals neither polarity coincidence correlators nor multiplier correlators have proved to be completely satisfactory.

Accordingly it is an object of the present invention to provide a new and novel hybrid correlator which is particularly adapted for correlation of large amplitude transient signals. The hybrid correlator described herein is a compromise between the polarity coincidence correlator and the multiplier correlator. The hybrid correlator multiplies one channel of amplitude information with another channel of time compressed polarity quantized information. This product then appears at the output as a number of real time correlation delay points which are based on an integration time equal to the sample period. The semi-unnormalized output, simplicity, and short integration time of the hybrid correlator adapt it for the correlation of large amplitude transient signals.

FIG. 1 of the drawings is a block diagram of the hybrid correlator;

Figure 1:
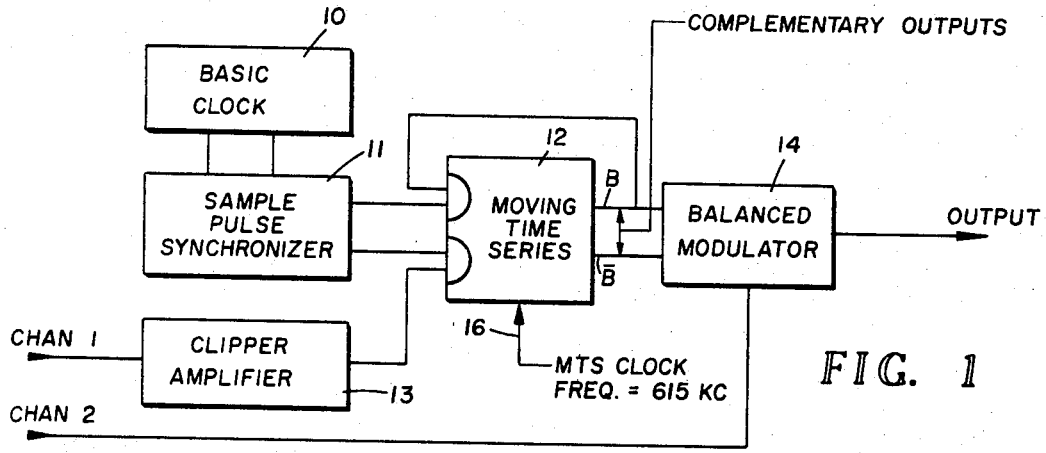

Referring to FIG. 1 there is shown a pair of input channels for receiving large amplitude low frequency input signals. Channel 1 has a clipper amplifier 13 connected at the input thereof and a delay line time compressor including the moving time series or recirculating memory 12 and the associated sampling circuits 10 and 11 connected to the output of amplifier 13. The delay line time compressor including blocks 10, 11 and 112 is disclosed in U.S. Patent No. 2,958,039, which issued to Victor C. Anderson on Oct. 25, 1960. The high speed recirculating storage channel or the moving time series to which it is often referred is disclosed in the Anderson patent and is well known to those skilled in the data processing art.

A balanced modulator 14 has a pair of inputs connected to the complementary outputs of the moving time series 12 and another input connected to channel 2 for receiving the low frequency amplitude information. The time compressed polarity quantized information is multiplied by the amplitude information in channel 2 in the balanced modulator 14 and this multiplication provides an output waveform appearing as a number of real time correlation delay points based on an integration time equal to the sample period used during the quantization in the delay line time compressor.

Information in channel 1 enters the clipper amplifier 13 where it is quantized into one of two possible voltage levels (0 volts or —6 volts) depending on the polarity of the incoming signal. The quantized signal is then sampled at a 2.4 kc. (416 msec. period) rate by sample pulse synchronizer 11, and the polarity samples are then stored adjacent to one another in the moving time series 12. The moving time series used in the hybrid correlator has a 416 microsecond sample period and a 257 bit length. The maximum delay possible in the moving time series is then the product of the number of bits stored in the moving time series and the sample period, which is 106,-496 microseconds. Complementary outputs from the moving time series are the time compressed input polarity samples, where the compression factor of the delay line time compressor is equal to the ratio of the moving time series clock frequency 10 to the sample frequency. The complementary high frequency outputs at 12 are applied to the balanced modulator 14 and this high frequency input is modulated by the lower frequency amplitude information entering channel 2. The sample add and sample drop pulses are derived from the basic clock and synchronized by the sample pulse synchronizer such that the oldest sample is dropped when a new sample is added.

Figure 2:
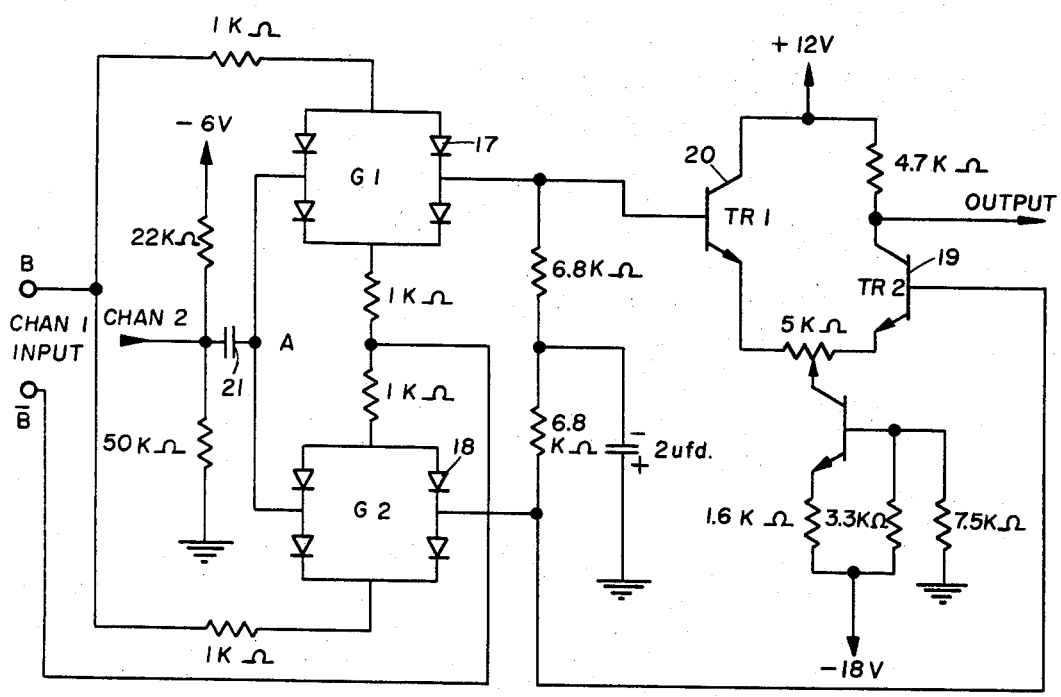
FIG. 2 is a detailed circuit diagram of the balanced modulator of FIG. 1.
Figure 3A:
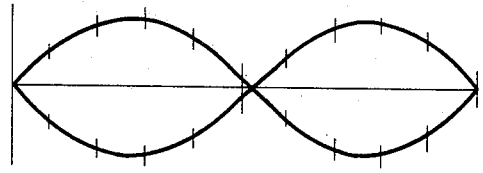
FIG. 3 illustrates correlator waveforms for various inputs applied to the correlator and which will be more fully described hereinafter.
Figure 3B:
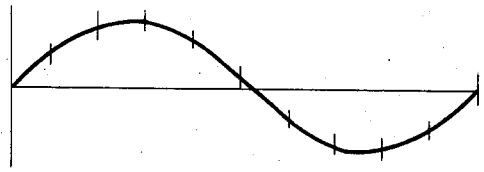
Figure 3C:
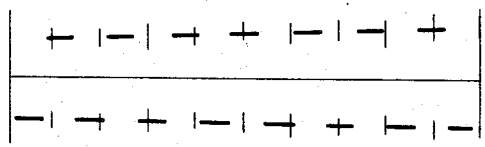
Figure 3D:
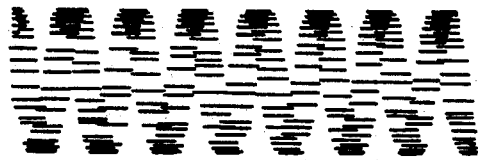
Figure 4A:
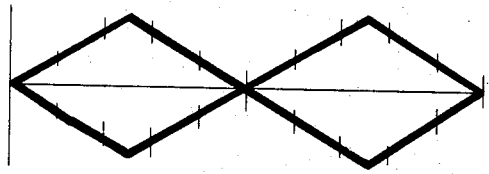
Figure 4B:
Figure 4C:
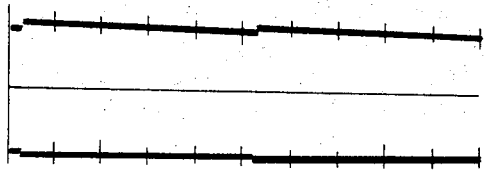
Figure 4D:
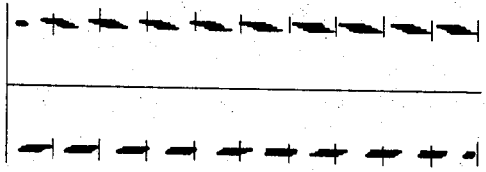

FIG. 2 shows a detailed circuit diagram of the balanced modulator of FIG. 1. A pair of conductors B and $\bar{B}$ connect the output of the moving time series 12 in channel 1 to opposite sides of the pair of diode bridge gates G1 and G2. Channel 2 is connected through coupling capacitor 21 to gates G1 and G2 as shown. If the quantized voltage levels 0 and —6 volts are applied at B and $\bar{B}$ respectively the diodes of G2 will be reversed biased and the diodes of G1 will be forward biased. Thus any signal applied at terminal A will be applied directly to the base of transistor 20. Since the D.C. bias is such that both transistors 20 and 19 are biased on, the signal applied to the base of 20 will also be applied to the emitter of transistor 19. For this case the output voltage will be proportional to the amplitude of the incoming signal in channel 2 and will have the same polarity as the signal applied at A corresponding to multiplication by +1. If, however, the quantized voltage levels are reversed such that —6 volts is applied to B and 0 volts is applied to $\bar{B}$, the diodes G2 will be forward biased and the diodes of G1 will be biased off. Any signal at A will now be applied to the base of transistor 19 and the output at the collector of 19 will be proportional to the amplitude of the signal at A, but will have an oppoiste polarity, corresponding to multiplication by −1. Thus the modulator output is the product of the amplitude information applied at A and the time compressed polarity sampled information applied at B and B̄. The result is a semi-unnormalized correlation function based on a single sample for each delay point. To make a useful approximation to the true correlation function, successive outputs will have to be averaged.

Pictures of the output waveforms when sinusoidal, triangular, and squarewave input signals were applied to channel 2 of the hybrid correlator are shown in FIGS. 3 and 4. FIG. 3a shows a correlator output when the 72 c.p.s. signal shown in FIG. 3b was applied to channel 2, the sweep rates for FIG. 3a and FIG. 3b being the same. FIG. 3c shows the output for a single 416 microsecond full sweep triggered by the sample pulse. FIG. 3d shows a succession of several such outputs. Here it should be noted that the period of the output wave is equal to the product of the input signal period and the reciprocal of the moving time series compression factor. FIGS. 4a, 4b, 4c and 4d show the correlator output waveforms for triangular and squarewave input signals respectively. FIGS. 4a and 4c show the output for a sweep length equal to the input signal period in FIGS. 4b and 4d of one sample period full sweep.

The hybrid correlator described herein is a useful device for the correlation of large amplitude transient input signals and correlation of this type of signal necessitates a short integration time and a large processing gain. The hybrid correlator is a simple, relative inexpensive device that will meet these requirements. However, some post-integration will be necessary.

It should be understood that many variations and modifications may be made in the present invention without departing from the spirit and scope thereof. Accordingly, the invention is limited only by the scope of the appended claims.

What is claimed is:
1. Signal analyzing apparatus comprising:
 a first signal channel for receiving a first low frequency signal, said first channel means includes means for clipping said first low frequency signal,
 means in said first signal channel for polarity quantizing and time compressing said first low frequency signal, said polarity quantizing and time compressing means including means for sampling said first low frequency signal at a high rate of speed and means for storing the time compressed replica of said first low frequency signal in a recirculating storage channel,
 a second signal channel for receiving a second low frequency signal, and
 means coupled to the outputs of said first and second channels for multiplying said second low frequency signal in said second channel and the time compressed polarity quantized information at the output of said first channel to obtain a semi-unnormalized output which is a sequence of correlation delay points in real time, said means for multiplying including a balanced modulator having a pair of complementary inputs connected to said recirculating storage channel and another input connected to receive said second low frequency signal.

2. The combination of claim 1 wherein said balanced modulator has a pair of diode bridge gates connected to receive the outputs of said recirculating storage channel and the second low frequency signal,
 said gates being alternately forward and reverse biased upon receipt of first and second quantized voltage levels,
 means for providing an output signal corresponding to the multiplication of said second low frequency signal by plus one upon receipt of said first quantized voltage level at said diode bridge gates and corresponding to the multiplication of said second low frequency signal by minus one upon receipt of said second quantized voltage level at said diode bridge gates.

References Cited
UNITED STATES PATENTS

| | | | |
|---|---|---|---|
| 2,280,524 | 4/1942 | Hansen | 324—77 |
| 2,562,912 | 8/1951 | Hawley | 324—87 |
| 2,958,039 | 10/1960 | Anderson | 324—77 |
| 3,029,386 | 4/1962 | Ricker | 324—87 |
| 3,145,341 | 8/1964 | Andrew. | |
| 3,168,699 | 2/1965 | Sunstein et al. | |

RUDOLPH V. ROLINEC, *Primary Examiner.*

P. F. WILLE, *Assistant Examiner.*